United States Patent [19]

Druegh et al.

[11] Patent Number: 4,821,267

[45] Date of Patent: Apr. 11, 1989

[54] MONITORING APPARATUS FOR MONITORING THE OPERATING CONDITION OF TRANSMISSION FACILITIES OF COMMUNICATIONS TRANSMISSION TECHNOLOGY

[75] Inventors: Paul Druegh; Volker Schmidt, both of Munich, Fed. Rep. of Germany

[73] Assignee: Siemens Aktiengesellschaft, Berlin and Munich, Fed. Rep. of Germany

[21] Appl. No.: 36,667

[22] Filed: Apr. 8, 1987

[30] Foreign Application Priority Data

Apr. 11, 1986 [DE] Fed. Rep. of Germany ....... 3612275

[51] Int. Cl.⁴ .............................................. G06F 11/30
[52] U.S. Cl. ......................................... 371/22; 371/15
[58] Field of Search ...................... 371/22, 15; 370/13, 370/14; 375/10; 455/67; 358/139; 379/1, 26

[56] References Cited

U.S. PATENT DOCUMENTS

| | | | |
|---|---|---|---|
| 3,943,348 | 3/1976 | Akriche | 371/22 |
| 4,301,536 | 11/1981 | Favin | 271/22 |
| 4,555,806 | 11/1985 | Lange | 455/67 X |
| 4,710,929 | 12/1987 | Kelly | 371/22 |
| 4,713,810 | 12/1987 | Chum | 371/22 X |

FOREIGN PATENT DOCUMENTS

| | | |
|---|---|---|
| 0156753 | 10/1985 | European Pat. Off. . |
| WO 84/03359 | 8/1984 | Fed. Rep. of Germany . |
| DE 3506945 | 8/1986 | Fed. Rep. of Germany . |
| 55-90160 | 7/1980 | Japan . |
| 59-43639 | 3/1984 | Japan . |

OTHER PUBLICATIONS

"Die Alarmregistrieranlage Arega A 150"; E. Diggelmann, B. Luescher, Hasler-Mitteilungen Nr. 3, 1975; pp. 77–88.
"Measurement of Error Performance on Digital Line Systems", P. J. May, Colloqniumon Interference and Crosstalk on Cable Systems, Jan. 12, 1984, pp. 3/1–3/8.
"Telecom Report 2", Special Issue Digital Transmission, 1979, p. 188.

Primary Examiner—Jerry Smith
Assistant Examiner—Robert W. Beausoliel
Attorney, Agent, or Firm—Hill, Van Santen, Steadman & Simpson

[57] ABSTRACT

Monitoring apparatus is disclosed for monitoring the operating condition of transmission facilities of communications transmission technology, whereby signal collectors (stations) of a signal collecting device collect trouble reports acquired in monitoring the transmission. The monitoring apparatus should collect trouble reports in as economical a manner as possible and should keep further criteria for the quality of the monitored transmission devices ready for interrogation, as needed. This is achieved by a monitoring apparatus having an evaluation and memory device which periodically registers measured values. The measuring device can be advantageously employed for monitoring line terminal equipment in PCM transmission facilities.

10 Claims, 3 Drawing Sheets

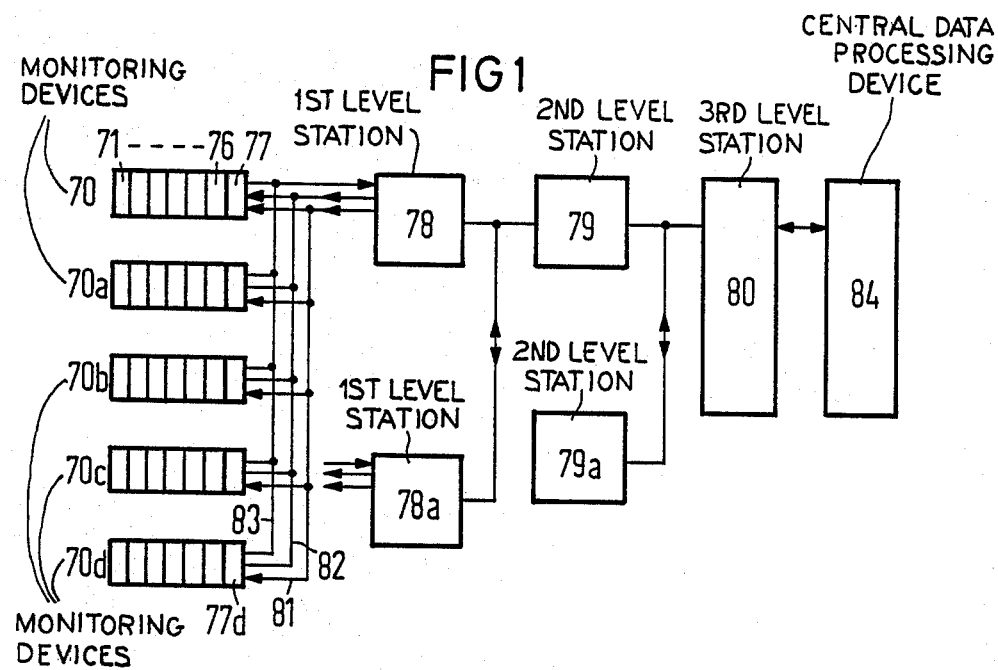
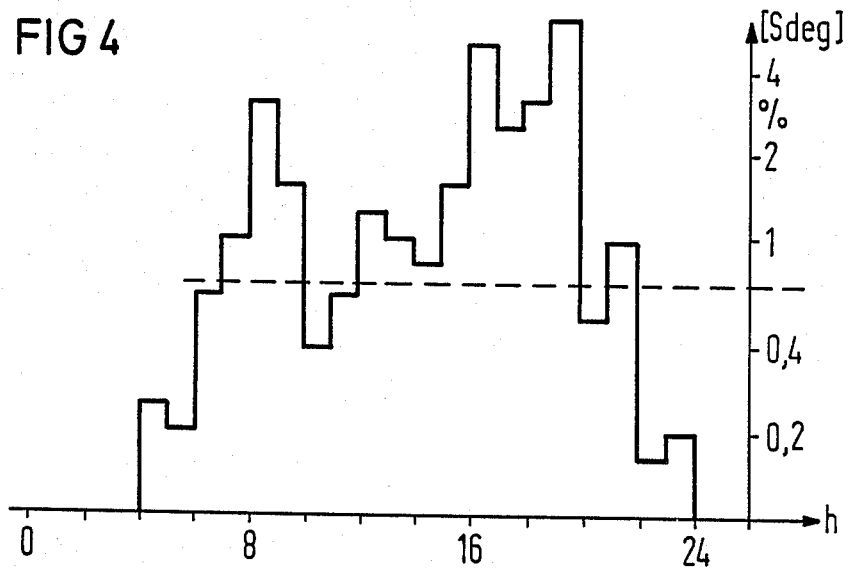

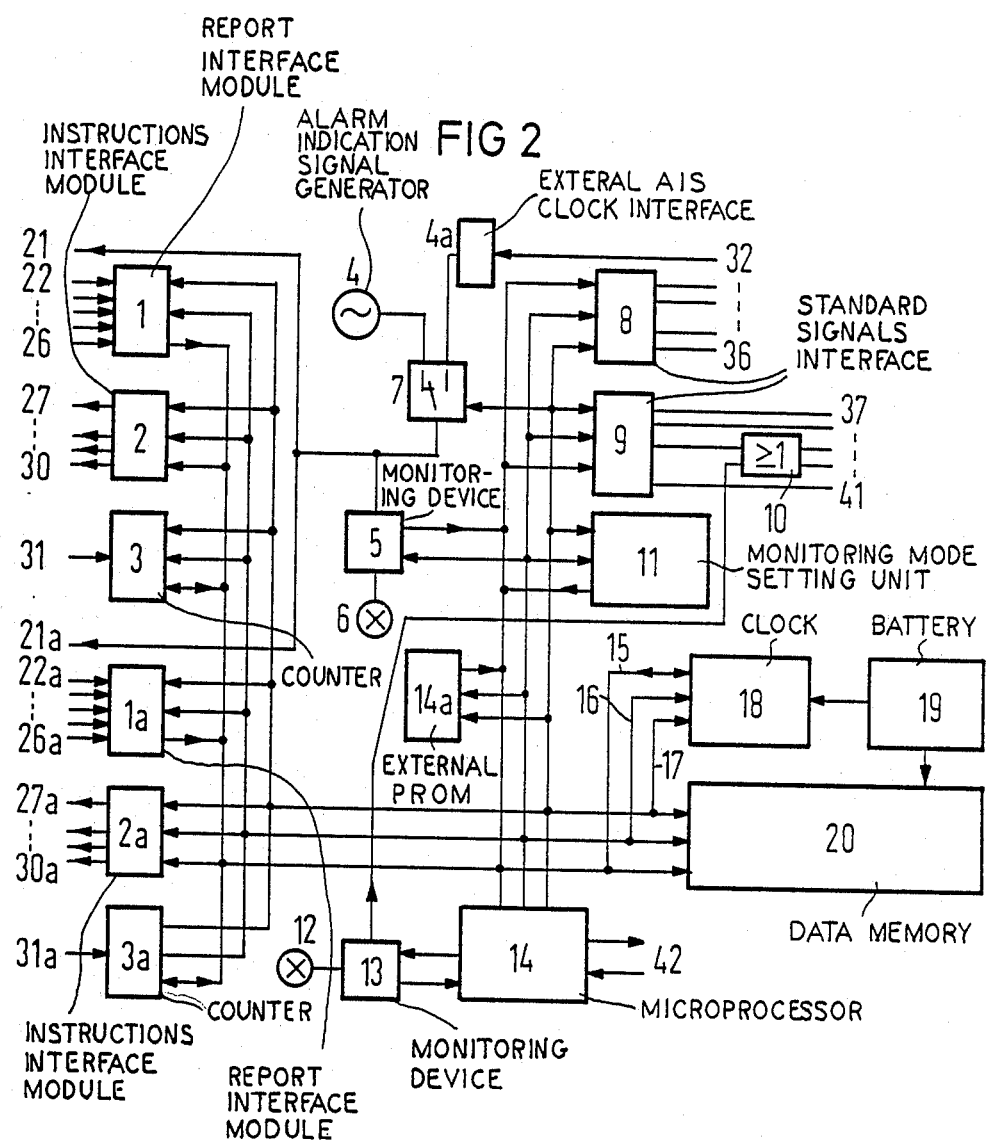

MONITORING APPARATUS FOR MONITORING THE OPERATING CONDITION OF TRANSMISSION FACILITIES OF COMMUNICATIONS TRANSMISSION TECHNOLOGY

BACKGROUND OF THE INVENTION

1. Field of the Invention

The present invention is related to a monitoring apparatus for monitoring the operating condition of transmission facilities of communications transmission technology which are composed of assemblies in which the monitoring apparatus requires both trouble reports and measured values and contains a monitoring information generator which is connectible, together with monitoring information generators of further monitoring apparatus, to signal collectors of a signal collecting device for central operation observation.

2. Description of the Prior Art

E. Diggelmann, B. Luescher, "Die Alarmregistrieranlage AREGA A 150", Hasler-Mitteilungen, No. 3, 1975, pp. 77-88, discloses the use of a process control computer for the periodic interrogation of a great number of inputs in order to obtain the most accurate information possible regarding the disturbance behavior of a transmission network. This known system contains a sampling system. The sampling system is composed of a sample control unit and up to four sample multiplexers. The multiplexers allow a group-by-group interrogation of the signal stage by the sample control unit which, among other things, has the task of comparing the signal states to the states of the preceding sample cycle and of writing all deviations in a special form into a line number memory where they are further processed.

Two signals are brought to the alarm registration system for every line to be monitored. These two signals can exhibit only two states. The signal states whether a line is disturbed or undisturbed; the other signal states whether an alarm bell is switched on or off.

In the evaluation, the disturbances are divided into three classes depending upon duration. Sequence reports are also suppressed.

Comparatively frequent alarms, given faults or disturbances identified in communications transmission, can be the reason that a communications transmission link is subjected to special observation. For example, given comparatively frequent fault alarms in digital systems, a code error test position or, respectively, a test position for the acquisition of the wrong frame recognition words, can be installed at a suitable location and the test results can be evaluated on the basis of a tape printer protocol. In particular, one can check whether the respective requirements made of the transmission quality, as can be prescribed by the requirement G821 of the CCITT, or the like, are fulfilled. Even given an evaluation by a computer involved in the test position, this involves considerable expense, particularly when many transmission systems are to be simultaneously monitored.

SUMMARY OF THE INVENTION

The object of the present invention is to provide a monitoring apparatus, as particularly set forth above in the introductory portion, such that trouble reports are collected in an optimally-economical manner and, in addition, further criteria regarding the quality of the monitoring transmission facilities can be kept ready for interrogation as needed.

According to the present invention, the above object is achieved in a system of the type set forth above which is particularly characterized in that the monitoring is provided with an evaluation and memory device, and in that measured values periodically acquired by way of the evaluation device and edited are registered step-by-step with the assistance of the memory device such that the memory contents are cyclically overwritten. All, or only particularly urgent trouble reports, can thereby be supplied to the signal collecting device. Under given conditions, the memory device can store trouble reports in addition to the measured values and maintain such reports for a potential interrogation. A microcomputer preferably serves as an evaluation device which interprets the collected information in view of the data to be registered.

In particular, the measured value can be code errors, losses of synchronism, noise levels or the like. Measuring apparatus which can potentially undertake a preprocessing of raw data or, respectively, of original measured values, are provided for these measured values in the devices to be monitored. The measured values can be compared to prescribed limit values in the devices and/or in the evaluation and memory devices in order to form trouble reports. Urgent or less urgent alarms can thereby be discriminated.

Deriving, due to these measures, is the advantage that, in addition to trouble report information, further criteria can be collected in a particularly economical manner in communications transmission facilities having a plurality of structural units and can be kept on hand for potential, further evaluation, these providing more information concerning the transmission quality of the monitored transmission facilities. It is of particular advantage that an ongoing supervision of the transmission quality is possible with comparatively little expense and the data set arising for transmission by the signal collecting device can be kept small because interrogation and documentation have to be carried out only as needed, for example, upon instruction from a customer. A rather significant advantage is that, upon instruction of a customer, the measured values are already extant, whereas one would usually first have to start a protracted measurement in order to check the transmission quality of the connection. In case of doubt, it can be decisive that the registration device has covered that time interval to which the instruction refers. This is only enabled by a continuous quality check. The ongoing registration of the measured values crucial for the transmission quality is carried out over a suitable time interval which preferably covers several days. An interrogation and an evaluation of the register data only occur, in particular, for a given reason. In particular, subsequent clarity regarding potential trouble events can be acquired, for example, given instructions of telephone or data transmission customers. The monitoring of digital connections is based on the CCITT recommendation G821 which prescribes the values defined for the proportion of sections and minutes infested with bit errors. At least one week is assumed as a reference time interval; the evaluation with the reference time of one day can also be advantageous.

Since the data are stored in a device to be monitored, it is possible to equip the rack with different types of devices without reprogramming a central registration device. In addition, the pre-history of an apparatus can be analyzed in a repair shop given outage of the apparatus, the analyzation being carried out on the basis of the stored data.

In accordance with a particular feature of the invention, the apparatus is particularly characterized in that the monitoring device is provided for monitoring a plurality of packages accommodated in a common mounting device and comprises a central monitoring portion which is accommodated as a monitoring package in the same mounting device, and in that the central monitoring portion is provided with the evaluation and memory device and contains the monitoring information generator, so that the common acceptance device can be included, particularly of the format 7R. The monitoring package thereby represents one assembly.

According to another feature of the invention, the evaluation and memory device and the monitoring information generator comprise a common microprocessor as a device for executive or control sequencing. Therefore, a microprocessor is thereby preferably employed.

According to another feature of the invention, the central monitoring portions are respectively provided with the central signaling device for the packages connected thereto. This involves particularly little wiring expense and is particularly suited for pointing out the manner for operation of the faulty apparatus.

A subdivision of the monitoring device into a central portion and into a plurality of decentralized portions, which is particularly advantageous in view of the simple wiring structure derives in accordance with another feature of the invention which is particularly characterized in that, as monitored packages, a plurality of transmission and/or receiving assemblies of a PCM communication transmission facility are accommodated in one and the same insert together with an assigned monitoring assembly as a central monitoring portion, and in that the transmission and/or receiving assemblies respectively contain a device for code error recognition, and in that the monitoring assembly contains a counter which is connectible to an assigned code error recognition device containing the counter per transmission and/or receiving assembly.

In accordance with another feature of the invention, a clock is provided in the central monitoring portion, and the edited measure values and trouble reports are respectively storable together with the time of day. This enables the time of an apparatus of system outage during the automatic registration of the measured data to be retained, so that a chronological assignment of the measured values of various registration devices is possible in a later interrogation of the data.

According to another feature of the invention, the clock, or the clock and the memory device, are connected to a battery to guarantee that the function of the clock is preserved even given a temporary outage of the power supply. When a data memory that is dependent on an interruption-free power supply is employed, it is assured that the memory contents are preserved given an apparatus removed from the mounting device.

A formation of trouble reports in the central monitoring portion has the advantage that additional or altered alarm criteria can be taken into consideration without modifying the monitor assembly. In particular, a PROM is provided in accordance with a particular feature of the invention to store the monitoring program and can be easily programmed in particular with respect to the user's requirements. Further, the monitoring device can easily be equipped with a new monitoring program by replacing the PROM's.

According to another feature of the invention, an apparatus for setting the monitoring mode is provided and is connected to the device for executive sequencing, such as a microprocessor, so that then the apparatus can be easily set to the respectively desired monitoring mode within the scope of the prescribed monitoring program. In particular, the prescribed limit values for the evaluation can be modified. Given an EEPROM, this can particularly occur with the assistance of a follow up computer connectible to the microprocessor.

BRIEF DESCRIPTION OF THE DRAWINGS

Other objects, features and advantages of the invention, its organization, construction and operation will be best understood from the following detailed description taken in conjunction with the accompanying drawings, on which:

FIG. 1 is a schematic diagram of a circuit arrangement for collecting trouble report information of a plurality of monitoring devices;

FIG. 2 is a schematic circuit diagram of a central monitoring portion of a monitoring device comprising signal registration means.

FIG. 4 is a graphic illustration of a protocol that can be produced from the data interrogated in the data memory of the monitoring device of FIG. 2 and from which quality features of a monitored communications transmission equipment proceed.

DESCRIPTION OF THE PREFERRED EMBODIMENTS

Figure 3:
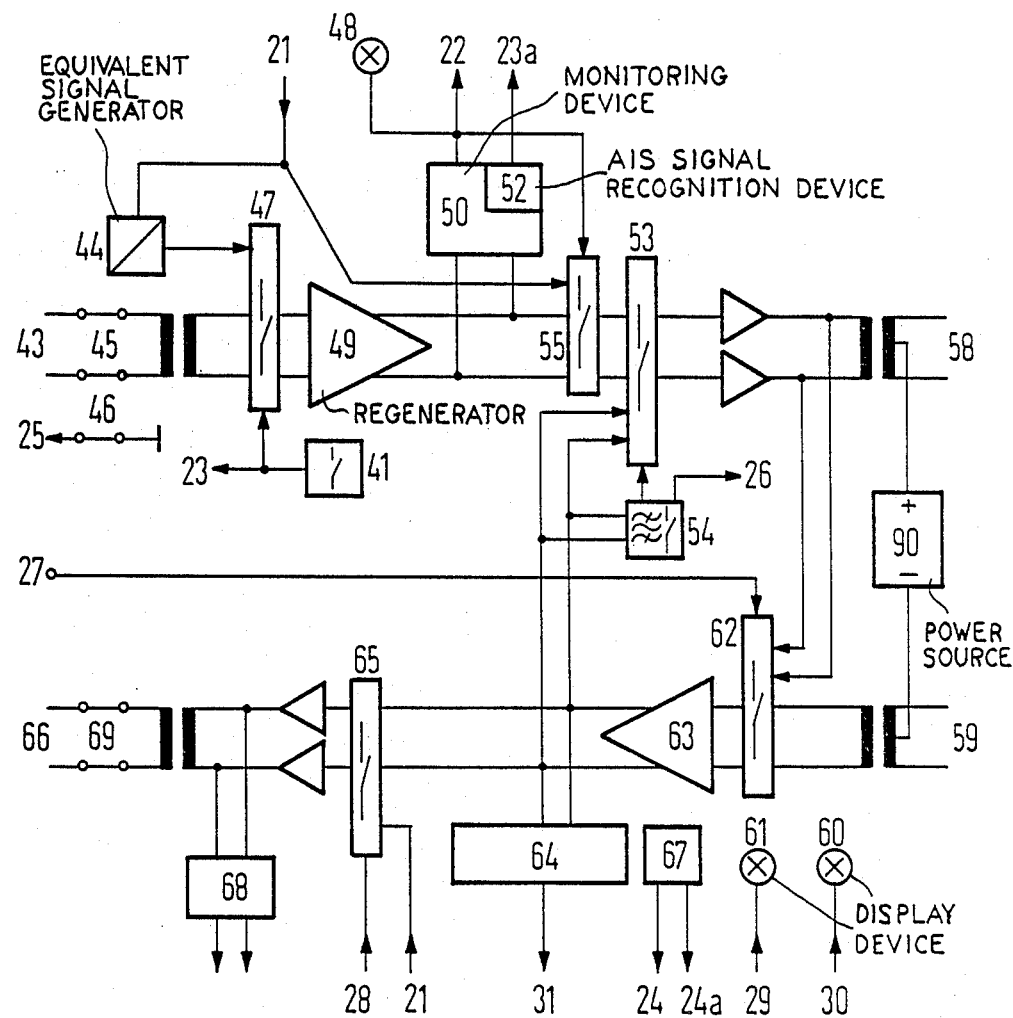
FIG. 3 is a schematic circuit diagram of a line terminal comprising a decentralized monitoring portion that is connectible to a central monitoring portion of FIG. 2.

FIG. 1 illustrates a signal acquisition apparatus comprising a data network having a tree structure. The stations are arranged in a plurality of network levels. A station 80 of the third network level is connected to a central data processing device 84. The stations of the second network level are connected to the station 80, only the station 79 and 79a of this second network level being illustrated on the drawing. The number of stations of the second network level can be equal to or less than, for example, 120.

A respective plurality of stations are connected to the stations 79 and 79a of the second network level, only the station 78, 78a thereof being illustrated as connected to the signal receiver 79 on the drawing. The number of stations of the first network level which can be respectively connected to a station of the second network level can likewise be, for example, 120.

A plurality of signal generators respectively contained in a central monitoring portion are connected to each station of the first network level. Of these monitoring portions, only the monitoring portions 77 . . . 77d of the apparatus 70 . . . 70d, constructed as portions of communications transmission equipment, are shown, these monitoring portions 77 . . . 77d being connected to the signal station 78. The number of signal generators connected to a station of the first network level amounts to, for example, 16.

The stations are respectively connected via buses that are operated in accordance with full duplex operation or half duplex operation. The station 84 is located at a trunk or, respectively, head of the network. The signal generators are located at the branches. The stations of the first and second network levels are respectively located at nodes of the data network.

The signal generators of the monitoring portion 77 . . . 77d are connected to the signal station 78 via an address bus 81 and a data bus 83. Moreover, each signal generator is connected to the assigned signal station via a control bus 82. The function of the address bus can also be assumed by instruction lines which lead, star-like, from the signal stations to the devices.

The signal stations 78 and 78a which, in particular, can be formed by microprocessor circuits, collect trouble report information and forward the same to a central data processing device. The signal station 78 thereby receives, for example, messages from the devices 70 . . . 70d to be monitored. The messages are respectively emitted by monitoring devices integrated in this equipment which respectively transmit the messages in response to an interrogation by the appertaining signal station. In the exemplary embodiment of FIG. 1, the equipment to be monitored are inserts, each having six 2-Mbit/s line terminal equipment and the central monitoring portion. Equipment of other communications transmission facilities can be monitored in a corresponding manner.

The signal station 78 or, respectively, 78a evaluates the received messages based on trouble reports and sends these messages to the signal station 79, which forwards the trouble report information collected in the next network level to the signal station 80. The information can be displayed and documented in the central data processing device 84. Measures for the elimination of trouble can then be initiated from the central data processing device 84.

In this regard, the signal collecting network has the function of a signaling device.

For a monitoring of the devices 70 . . . 70d in view of specific quality features, measured values are also continuously acquired, evaluated and registered, in addition to the trouble report information.

Each signal generator of the monitoring portions 77 . . . 7d contained in the devices 70 . . . 70d is combined with a signal registration device in a monitoring assembly constructed as a printed circuit (PC) card assembly.

During operation, the measured values are interrogated by the apparatus contained in the central monitoring portion for controlled sequencing of the devices 70 . . . 70d and are continuously registered in the memory device.

In the exemplary embodiment of FIGS. 2 and 3, these are the code errors of the 2-Mbit/s signal which have respectively accumulated in one second in the line terminal equipment 71 . . . 76. In the normal case, the measuring information is not transmitted from the central monitoring portion 77 to the assigned signal station 78. The evaluation and memory device evaluates measuring information, particularly code errors, which are continuously acquired in the line terminal equipment and stores the result in defined time intervals, for example, one hour.

It can sometimes be useful in the evaluation to co-register the trouble reports, even though this job is predominantly undertaken by the central data processing device 84. Trouble reports are stored when they occur, together with the time of day. Edited measured values are stored hourly, together with the time of day.

The evaluation of the measured results occurs in the signal registering device contained in the central monitoring portion. Device identifiers (for example operational setting, equipment), can also be stored. The data are preferably evaluated such that they can be placed in direct relationship to the requirements of the prescribed specification. The data bus therefore stored over, for example, a number of days can then be fetched and documented as needed with the assistance of a personal computer via the terminal 42 (FIG. 2) of the central monitoring portion which has a serial interface. This can occur, on site, or at some other location to which the appertaining device is brought for examination purposes. On the other hand, the data memory of the appertaining monitoring device, the data memory being constructed as a bubble memory in this case, for example, can be removed in order to evaluate its contents at some other location.

In contrast to the signal collectors (stations) the signal registration device is specifically tailored to the type of apparatus to be monitored. The same microprocessor assembly can thereby be employed for many types of apparatus. The adaptation to the specific requirements then occurs on the basis of the evaluation program.

FIG. 2 illustrates a wiring diagram for the central monitoring portions 77 of the device 70 of the circuit arrangement illustrated in FIG. 1. For example, 6 pulse code modulation (PCM) line terminal equipment of the type illustrated in FIG. 3 and, in addition, a device for remote power supply per line terminal equipment can be connected to the central monitoring portion.

The microprocessor 14 serves as a device for controlled sequencing and is provided with a monitoring device 13 which, in particular, can be what is referred to as watch dog circuit. One output of the monitoring device 13 is connected to a display device 12.

A plurality of integrated circuits are connected to the microprocessor 14 via a data bus 15, an address bus 16 and a control bus 17. An interface module 1 for reports, an interface module 2 for instructions and a counter 3 for counting code infringement pulses are provided per line terminal equipment connectible to the monitoring unit and are connected to the buses 15-17. Further modules connected to the buses 15-17 are an external PROM (14a) for storing the monitoring program, the interface modules 8 and 9, a device 11 for setting the monitoring mode, a clock 18 and a data memory 20.

The interfaces 8 and 9 are connected to the buses 15-17 and serve for the connection of standard signaling devices. The interface 8 emits what are referred to as system alarms ZA and ZB or, respectively, collected alarms in two urgency levels. The outputs of the interface 9 are connected to a signal field in the rack. The alarms A/AZ, a signal EL having the significance "signal acknowledged" or, respectively, "locating device connected", as well as alarms B/BZ are output to the signal field, the latter alarms B/BZ being output via an OR gate 10 which has one of its inputs connected to the output of the monitoring device 13.

The central monitoring portion further, contains the alarm indication signal (AIS) generator 4 with the assistance of which an AIS signal is centrally generated for a plurality of line terminal equipment. With the assistance of a transfer device 7, the output of the AIS generator 4 or the output of the device 4a for an external AIS clock can be selectively fed to the terminals 21, 21a, etc or, respectively, to a terminal per line terminal equipment.

A monitoring device 5 for monitoring the AIS signal has its AIS signal input connected to the output of the transfer device 7. An output of the monitor 5 is connected to a display 6. The monitor 5 is also connected to the data bus 15 and to the address bus 16.

The data memory 20 is a memory having random access, particularly a random access memory (RAM) buffered by way of a battery 19 or a bubble memory. The memory capacity is preferably selected such that it suffices for one week of operations. For example, a 64K byte can be employed.

During normal operation, the clock 18 and the data memory 20 are supplied from a power supply which is not shown on the drawings. The clock 18 and the data memory 20, constructed as a random access memory (RAM) in the illustrated example, are additionally connected to the battery 19. The battery 19 can be buffered by the power supply and assumes the feed of the data memory and the clock when there is an outage of power supply.

Furthermore, the monitoring mode setting device 11 is connected to the buses 15–17. The monitoring mode setting device 11 can be formed by a code switch or by an EEPROM which can be set with the assistance of a follow-up computer connected to the serial interface at the terminal 42.

The line terminal equipment illustrated in FIG. 3 contains a regenerator 49 or, respectively, 63 per transmission direction. In the transmission direction exchange/line), the communications signals proceed from an input 43 to an output 58 via a pair of contacts 45 to a selective feed device 47 for selective feed of an equivalent signal, via the regenerator 49, via a selective feed device 55 for selective feed of an AIS signal, and via a device 53 for selective generation of a loop closure.

In the receiving direction (line/exchange), the communications signals proceed from an input 59 to an output 66 via a selective loop closure generation device 62, via a regenerator 63, via a selective feed device 65 for selective feed of an AIS signal, and via a pair of contacts 69. Together with the contact 46 having a pole connected to ground, the contact pairs 49 and 69 belong to one and the same plug connector.

A terminal 21 for receiving an AIS signal is connected, first of all, to the equivalent signal generator 44 and, secondly, to the selective feed device 55. The selective feed device 47 is connected to the equivalent signal generator 44.

The monitoring device is connected to the output of the regenerator 49, the monitoring device 50 emitting a trouble signal to a terminal 22 as soon as communications signals fail to appear at the output of the regenerator 49. Simultaneously, the instruction "feed AIS signal" is emitted to the selective feed device 55. The monitoring device 50 comprises a device 52 for the recognition of AIS signals which emits the criterion "AIS signal recognized" at a terminal 23a under given conditions.

Under given conditions, a display 48, connected to the monitoring device 50, indicates that no signal is present at the output of the generator 49.

A code error recognition device 64 is connected to the output of the regenerator 63 and has its output connected to the counter 3 (FIG. 2) of the central monitoring portion by way of a terminal 31.

The central monitoring portion of FIG. 2 and the line terminal equipment of FIG. 3 are additionally connected to one another in the following manner.

The AIS signal edited in the AIS oscillator 4 or in the editing device 4a is fed by way of the terminal 21 to the equivalent signal generator 44, to the selective feed device 55 and to the selective feed device for the AIS signal 44 and to the selective feed device 65 for the opposite transmission direction. Under given conditions, a signal having the significance "signal at input 43 not present" proceeds to the interface 1 from the monitoring device 50 via a terminal 22 and, under given conditions, a signal having the significance "AIS signal recognized" proceeds to the interface 1 via the terminal 23a.

An answer back device 67 emits an answer back signal to the interface 1 via a pair of terminal 24 and 24a, the answer back defining the type of device and representing information concerning the equipping of the rack location.

In normal operation, ground potential is connected to the interface module 1 via the terminal 25 which is connected to the contact 46 of the plug connection. When the selective feed device 47 is set to a standby mode with the assistance of a switch 41, then a corresponding setting signal is fed from the output of the switch 41 to the interface 1 via the terminal 23.

When a locating device is connected to the line terminal equipment, then the contact 46 is opened. The locating device may emit a loop closure instruction to the device 62 via a terminal 27.

The interface 2 emits instructions to the line terminal equipment of FIG. 3. An AIS feed in instruction may proceed to the selective feed device 65 by way of a terminal 28, a control signal for the activation of a display 61 to indicate a bit error rate greater than $10^{-3}$ is fed via a terminal 29 and a control signal for activation of a display 60 is input by way of a terminal 30 to indicate a bit error rate of greater than $10^{-5}$.

The output of the code error recognition device 64 is connected to the counter 3 of FIG. 2 by way of a terminal 31.

The central monitoring portion of FIG. 2 serves the purpose of monitoring six line terminal equipment and the appertaining remote feed components. The microprocessor 14 controls the interfaces 1, 2, 3, 8 and 9 via the data bus 15, the control bus 17 and the address bus 16. The central monitoring portion is augmented by the clock 18 and the data memory 20 to form a monitoring and registering device.

First of all, the monitoring device of FIGS. 2 and 3 serves the purpose of monitoring the transmission. The defined alarm criteria are relatively rough and are only intended to enable the decision whether alternate circuits should be undertaken or equipment should be replaced.

For the purpose of registering the transmission quality during operation, the monitoring apparatus also contains a memory and a clock. The stored data can be called proceeding from the signal collecting station via the interface 42. In particular, the central exchange initiates a communication of measured values via the signal collecting station at times in which no trouble reports are present, whereby it is then assured, per interrupt, that the transmission of trouble reports has priority.

Reports from the line terminal equipment shown in FIG. 3 are interrogated via the interface 1. The interface 2a and further interfaces not shown on the drawing are provided for additional line terminal equipment accommodated in the same insert and per each remote feed device.

It can be advantageous to entirely or partially accommodate these interfaces decentrally at the assemblies to be monitored. The connection of the assemblies to be monitored to the central monitoring apparatus is thereby carried out via data, address and control buses 15, 16 and 17.

According to FIG. 3, the reports for the line terminal equipment are "incoming signal lacking at the input 43", "AIS signal recognized", "standby mode", "locating device connected", "loop in the remote line terminal active" and identifiers from which, for example, a device number is evident. Whether the place provided for the line terminal equipment is equipped and with which assembly is likewise reported.

The counter 3 counts the code error pulses output by the line terminal equipment. The counter readings cyclically read by the microprocessor 14 enable the measurement of the code error rate, from which the desired alarm criteria are derived.

Alarms are output to the interfaces 8 and 9, in particular, system alarms from the interface 8 and alarms for a signal field by the interface 9. The type of alarm advantageously corresponds to the signaling concept standard in the appertaining communications transmission facility.

In addition, the central monitoring portion outputs a message at the interface 42 to the signal collecting station of the circuit arrangement of FIG. 1. In addition to the alarm data, this message also contains information concerning operational setting, equipping and the monitoring mode. In addition, it can also contain measured data.

The monitoring mode is set via the monitoring mode setting device 11 which is preferably a switch for an EEPROM. Under given conditions, the monitoring mode can be stored in the RAM of the processor 14 instead of in the apparatus 11. The apparatus 11 offers the possibility of modifying the monitoring mode as needed, so that the monitoring device can be adapted particularly easily to operational peculiarities. In particular, the monitoring can be set to be sensitive or insensitive to error bursts. On the other hand, urgent alarms can be output as non-urgent alarms and vice-versa. Furthermore, in order to achieve a hysteresis, a setting can be selected wherein the $10^{-3}$ alarm does not disappear until the $10^{-5}$ alarm is no longer applied.

"Remote feed down", "Remote feed circuit asymmetrical" and "locating device connected", as well as the operational setting "maximum voltage 100V" or, respectively, "maximum voltage 200V" can be called in as reports from the remote feed assembly 90 of FIG. 3.

FIG. 4 illustrates an example of an evaluation of measured values. What is documented here is the approximate value of the proportion of seconds in the 64-kbit channels disturbed by one or more bit errors, derived from the code errors in the 2-Mbit/s signal over the time of day h for one day. The mean value M of the anticipated value of the proportion of disturbed seconds has been additionally calculated in the signal registration device, this exceeding the prescribed maximum value of 0.4% in this case. Furthermore, a high-water mark for the hourly values could be entered. This document can be provided with particulars of date and measuring location and with the number of the system.

In the described example, measured values are identified by seconds. Nonetheless, the signal transmission facility is not overburdened in view of the data transmission capacity which, for example, amounts to about 19-2 kbaud between the signal stations. Since the measured data only have to be evaluated as needed (for example, request of a customer, maintenance), the storing is of particular advantage.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an in-service monitoring apparatus for monitoring the operational condition of transmission facilities of communications transmission technology which are composed of assemblies for transmitting and receiving signals, the monitoring apparatus having a monitoring device that acquires both trouble reports and measured values and that includes a monitoring information generator which is connectable, together with monitoring information generators of other monitoring devices, to signal receivers of a signal collecting apparatus for certain operations observations, and having an evaluation and memory device in said monitoring device in which the measured values are periodically acquired and edited, the improvement comprising:
    means for registering said acquired and edited measured values with said memory device such that the memory contents are overwritten in a cyclic manner.

2. The improved monitoring apparatus of claim 1, wherein:
    said monitoring device includes means for monitoring plurality of assemblies in a common mounting device and a central monitoring portion;
    said central monitoring portion includes said evaluation and memory device and said monitoring information generator.

3. Improved monitoring apparatus of claim 1, wherein:
    said evaluation and memory means and said monitoring information generator comprise a common microprocessor for control sequencing.

4. The improved monitoring apparatus of claim 3, wherein:
    said monitoring portions are respectively provided with a central signalling device for the assemblies connected thereof.

5. The improved monitoring device of claim 4, wherein:
    as monitored assemblies, a plurality of transmitting and receiving devices of a PCM communication transmission facility are connected together in the same respective monitoring assembly as a central monitoring portion; and
    said transmission and receiving assemblies respectively contain a device for code error recognition; and
    said monitoring assembly comprises a counter and a code error recognition device connection to said counter.

6. The improved monitoring apparatus of claim 5, wherein:
    said monitoring portion comprises a clock and the edited measured values and trouble reports are respectively storable together with the respective time of day.

7. The improved monitoring apparatus of claim 6, wherein:
said clock and said memory are connected to a battery.

8. The improved monitoring apparatus of claim 7, wherein:
said monitoring means comprises a programmable read only memory for storing the monitoring program.

9. The improved monitoring apparatus of claim 8, wherein:
setting means is provided for setting a monitoring mode and is connected to said means common microprocessor for central sequencing.

10. The improved monitoring apparatus of claim 5, wherein:
said monitoring portion comprises a central AIS generator for the assigned transmitting and receiving assemblies and comprises a monitoring device connected to said AIS generator and to said microprocessor for monitoring the AIS generator, and a display device connected to said monitoring device.

* * * * *